(12) United States Patent
Sugasawa et al.

(10) Patent No.: US 11,454,568 B2
(45) Date of Patent: Sep. 27, 2022

(54) GAS COMPONENT MEASURING DEVICE

(71) Applicant: JP STEEL PLANTECH CO., Yokohama (JP)

(72) Inventors: Toshiaki Sugasawa, Yokohama (JP); Ryuji Yamaguchi, Yokohama (JP); Takato Matsuo, Yokohama (JP); Mitsuhito Fujimoto, Yokohama (JP)

(73) Assignee: JP STEEL PLANTECH CO., Yokohama (JP)

( * ) Notice: Subject to any disclaimer, the term of this patent is extended or adjusted under 35 U.S.C. 154(b) by 412 days.

(21) Appl. No.: 16/492,425

(22) PCT Filed: Feb. 23, 2018

(86) PCT No.: PCT/JP2018/006652
§ 371 (c)(1),
(2) Date: Sep. 9, 2019

(87) PCT Pub. No.: WO2018/173625
PCT Pub. Date: Sep. 27, 2018

(65) Prior Publication Data
US 2020/0041382 A1    Feb. 6, 2020

(30) Foreign Application Priority Data

Mar. 22, 2017 (JP) .............................. JP2017-055475

(51) Int. Cl.
*G01M 15/10* (2006.01)
*G01N 21/3504* (2014.01)
*G01N 21/39* (2006.01)

(52) U.S. Cl.
CPC ...... *G01M 15/108* (2013.01); *G01N 21/3504* (2013.01); *G01N 21/39* (2013.01)

(58) Field of Classification Search
CPC . G01M 15/108; G01N 21/3504; G01N 21/39; G01N 2021/8557; G01N 21/85;
(Continued)

(56) References Cited

U.S. PATENT DOCUMENTS 7,742,153 B2 * 6/2010 Metzger .................... G01P 5/02
356/28
9,028,758 B2 * 5/2015 Keinan ................ G01N 1/2211
422/86
(Continued)

FOREIGN PATENT DOCUMENTS

CN    104280342 A    1/2015
JP    2-104848 U    8/1990
(Continued)

OTHER PUBLICATIONS

International Preliminary Report on Patentability dated Sep. 26, 2019 in PCT/JP2018/006652 (with English translation only).
(Continued)

*Primary Examiner* — Freddie Kirkland, III
(74) *Attorney, Agent, or Firm* — Oblon, McClelland, Maier & Neustadt, L.L.P.

(57) ABSTRACT

A gas component measuring device includes: a cyclone including a gas inlet; and a laser gas analyzer configured to take, in the cyclone, a measurement of a component of a subject gas that contains particulate matter and is introduced into the cyclone through the gas inlet.

17 Claims, 3 Drawing Sheets

(58) Field of Classification Search
CPC .......... G01N 2021/151; G01N 1/2211; G01N 21/05; G01N 21/61; G01N 1/22; G01N 2021/396
See application file for complete search history.

(56) References Cited

U.S. PATENT DOCUMENTS

| | | | |
|---|---|---|---|
| 9,243,939 B2* | 1/2016 | Tanoura | G01F 1/203 |
| 10,222,363 B2* | 3/2019 | Tamura | G01N 21/6428 |
| 10,302,563 B2* | 5/2019 | Deguchi | G01J 3/4338 |
| 10,509,029 B2* | 12/2019 | Tamura | G01N 21/64 |
| 2008/0088819 A1* | 4/2008 | Metzger | G01F 1/28 |
| | | | 356/28 |
| 2011/0150035 A1* | 6/2011 | Hanson | G01K 13/02 |
| | | | 374/161 |
| 2011/0159596 A1* | 6/2011 | Keinan | G01N 1/2211 |
| | | | 422/86 |
| 2012/0272825 A1* | 11/2012 | Brunnmair | B04C 5/081 |
| | | | 95/271 |
| 2012/0323502 A1 | 12/2012 | Tanoura et al. | |
| 2014/0020558 A1* | 1/2014 | Gururaja Rao | B03C 3/011 |
| | | | 96/57 |
| 2017/0191974 A1* | 7/2017 | Tamura | G01N 33/56983 |
| 2017/0191993 A1* | 7/2017 | Tamura | G01N 15/1459 |

FOREIGN PATENT DOCUMENTS

| | | |
|---|---|---|
| JP | 8-14522 A | 1/1996 |
| JP | 9-311098 A | 12/1997 |
| JP | 2009-39253 A | 2/2009 |
| JP | 2009-254603 A | 11/2009 |
| JP | 2011-127988 A | 6/2011 |
| JP | 2011-128079 A | 6/2011 |
| JP | 2011-220943 A | 11/2011 |
| JP | 2012-137429 A | 7/2012 |
| JP | 2014-240806 A | 12/2014 |
| JP | 2016-35408 A | 3/2016 |
| WO | WO 2012/126469 A1 | 9/2012 |

OTHER PUBLICATIONS

International Search Report dated May 22, 2018 in PCT/JP2018/006652 filed on Feb. 23, 2018.
Matsuda, T. et al., "Dust Explosions in a Cyclone System", Research Report of the Research Institute of Industrial Safety, RIIS-RR-87, 1987, pp. 124-137, 19 pages total (with English Abstract and partial English translation).
First Office Action dated Feb. 21, 2020 issued in corresponding Chinese patent application No. 201880019739.3.
Second Office Action dated Sep. 2, 2020 issued in corresponding Chinese patent application No. 201880019739.3.

* cited by examiner

GAS COMPONENT MEASURING DEVICE

TECHNICAL FIELD

The present invention relates to a gas component measuring device.

BACKGROUND ART

As a gas component measuring device that takes a measurement or measurements of a component or components of a subject gas by applying, to the measurement subject gas (hereinafter referred to as the subject gas), such as exhaust gas discharged from an electric arc furnace, laser light depending on properties of the subject gas, a device is available that emits the laser light from a light emitting portion to a light receiving portion, and detects at the light receiving portion which wave length of light is attenuated by the subject gas between the light emitting portion and the light receiving portion and how much the attenuation is, thereby taking a measurement(s) of the component(s) of the subject gas.

However, the subject gas contains particulate matter, such as dust and liquid droplets, and, when the concentration of such particulate matter is high, there is a possibility that the laser light cannot appropriately reach the light receiving portion and measurement is therefore not performed with high accuracy. For this reason, in conventional cases, a method is adopted, in which the particulate matter is removed from the subject gas with the use of a cyclone beforehand and the subject gas after removal of the particulate matter is then subjected to measurement using the gas component measuring device.

PRIOR ART DOCUMENT

Patent Document

Patent Document 1: Japanese Patent Application Publication No. 2016-35408 (JP 2016-35408 A)
Patent Document 2: Japanese Patent Application Publication No. 2014-240806 (JP 2014-240806 A)

SUMMARY OF INVENTION

Problems to be Solved by the Invention

However, in the conventional cases, it is necessary to perform the step of removing the particulate matter from the subject gas separately before taking a measurement(s) of the subject gas and therefore, there has been a problem of taking a long time.

The present invention has been made in consideration of such a problem and an object of the present invention is to realize a gas component measuring device, with which it is possible to quickly take a measurement(s) of a component(s) of a subject gas.

Means for Solving the Problem

A primary invention for achieving the above object is a gas component measuring device characterized by including:
a cyclone that has a gas inlet; and
a laser gas analyzer configured to take, in the cyclone, a measurement of a component of a subject gas that contains particulate matter and is introduced into the cyclone through the gas inlet.

Other features of the present invention will be clarified by this description and attached drawings.

Effects of the Invention

According to the present invention, a gas component measuring device is realized, with which it is possible to quickly take a measurement(s) of a component(s) of a subject gas.

EMBODIMENTS FOR CARRYING OUT THE INVENTION

Figure 1:
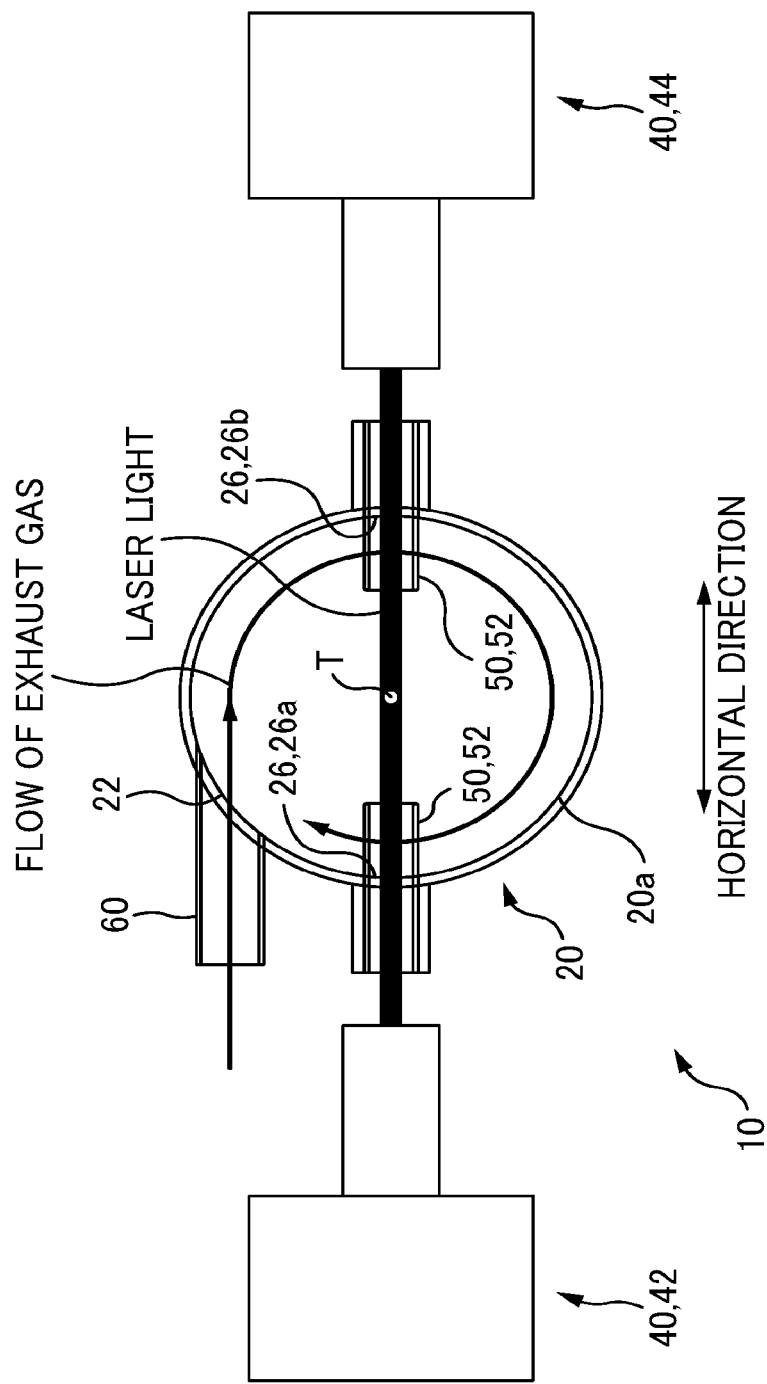
FIG. 1 is a top view of a gas component measuring device according to an embodiment.

This description and the attached drawings will clarify at least the following.

A gas component measuring device characterized by including:
a cyclone that has a gas inlet; and
a laser gas analyzer configured to take, in the cyclone, a measurement of a component of a subject gas that contains particulate matter and is introduced into the cyclone through the gas inlet.

With such a gas component measuring device, a gas component measuring device is realized, with which it is possible to quickly take a measurement(s) of a component(s) of a subject gas.

In this gas component measuring device,
it is preferable that the laser gas analyzer be configured to take the measurement of the component of the subject gas at a central area other than an outer area in the cyclone.

With such a gas component measuring device, it is made possible to appropriately solve the problem that the laser light is hindered from reaching the light receiving portion by the particulate matter.

In this gas component measuring device,
it is preferable that
the cyclone have a pair of opening portions, opposed to each other, in a side surface thereof, and
a light emitting portion of the laser gas analyzer be disposed so as to emit laser light into the cyclone through one of the pair of opening portions, and a light receiving portion of the laser gas analyzer be disposed so as to receive the laser light that exits through the other of the pair of opening portions.

With such a gas component measuring device, it is possible to realize a setup for taking a measurement(s) of the component(s) of the subject gas in the cyclone in a simple way.

In this gas component measuring device,
it is preferable that the gas component measuring device further include a displacing device configured to reduce the particulate matter on an optical path of the laser light by hindering passage of the particulate matter in a vicinity of each of the pair of opening portions within the cyclone.

With such a gas component measuring device, it is possible to appropriately realize a setup for performing the measurement aiming at, or selecting, the area, or region, in which the proportion of the particulate matter is relatively low in the cyclone that causes the centrifugal separation of the particulate matter from the subject gas.

In this gas component measuring device, it is preferable that the displacing device include a gas injection device configured to inject purge gas inward through each of the pair of opening portions.

With such a gas component measuring device, it is possible to appropriately realize a setup for performing the measurement aiming at, or selecting, the area, or region, in which the proportion of the particulate matter is relatively low in the cyclone that causes the centrifugal separation of the particulate matter from the subject gas.

In this gas component measuring device, it is preferable that the displacing device include a hollow pipe provided so as to protrude inward from each of the pair of opening portions.

With such a gas component measuring device, it is possible to appropriately realize a setup for performing the measurement aiming at, or selecting, the area, or region, in which the proportion of the particulate matter is relatively low in the cyclone that causes the centrifugal separation of the particulate matter from the subject gas.

In this gas component measuring device, it is preferable that a top of the cyclone be closed by a ceiling portion, the gas inlet be provided in the side surface of the cyclone, and a gas outlet, from which the subject gas is discharged along with the particulate matter, be provided at a lower end of the cyclone.

With such a gas component measuring device, it is possible to simplify the structure of the cyclone.

In this gas component measuring device, it is preferable that the cyclone have a protruding portion that extends downward from the ceiling portion and an outer shape of which is a surface of revolution, an axis of which is a vertical, central axis of the cyclone.

With such a gas component measuring device, it is made possible to induce a whirl (rotational flow) of the subject gas and it is therefore possible to suppress the occurrence of backflow of the subject gas.

In this gas component measuring device, it is preferable that the protruding portion have an inverted cone-like shape, in which a diameter thereof decreases downward.

With such a gas component measuring device, it is made possible to induce a whirl (rotational flow) of the subject gas and it is therefore possible to suppress the occurrence of backflow of the subject gas.

In this gas component measuring device, it is preferable that both the gas inlet and a gas outlet, from which the subject gas is discharged along with the particulate matter, be connected to an exhaust duct, through which exhaust gas discharged from a steel making electric arc furnace flows, and the gas component measuring device be configured to take the measurement of the component of the exhaust gas.

With such a gas component measuring device, the effect of the present invention becomes more advantageous.

===Gas Component Measuring Device 10 According to Embodiment===

Figure 2:
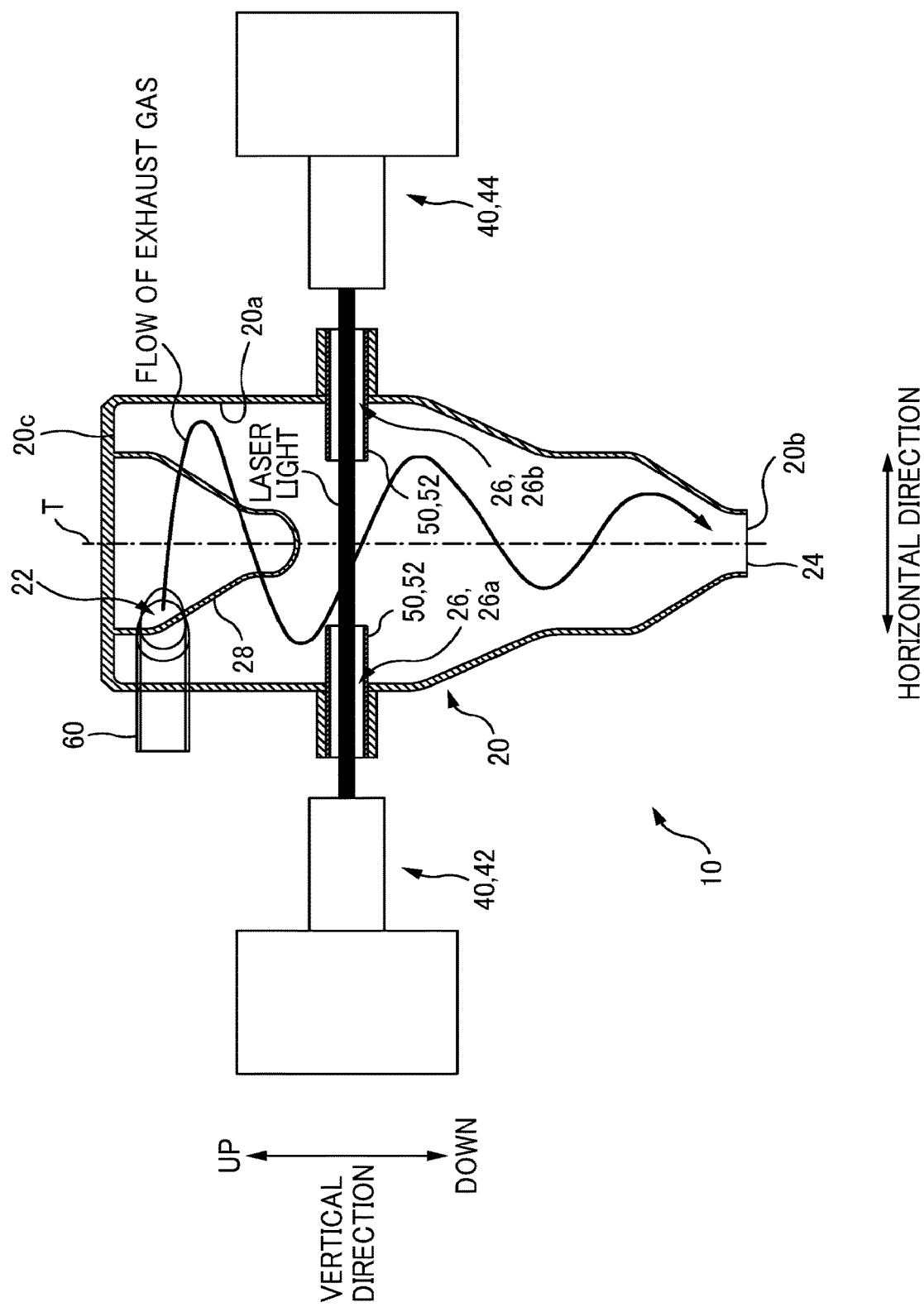
FIG. 2 is a side view of the gas component measuring device according to the embodiment.

Next, a gas component measuring device 10 according to an embodiment will be described with reference to FIGS. 1 and 2. FIG. 1 is a top view of the gas component measuring device 10. FIG. 2 is a side view of the gas component measuring device 10.

The gas component measuring device 10 according to this embodiment is for taking a measurement or measurements of a component or components of exhaust gas discharged from a steel making electric arc furnace. This means that the exhaust gas is a (measurement) subject gas of the gas component measuring device 10.

The exhaust gas discharged from the electric arc furnace flows to a dust collector, such as a bag filter or an electrostatic precipitator, through an exhaust duct, to which the gas component measuring device 10 is connected in a bypassing manner. Specifically, both a gas inlet 22 and a gas outlet 24 of the gas component measuring device 10, which are described later, are connected to the exhaust duct, through which the exhaust gas discharged from the steel making electric arc furnace flows. In this way, the gas component measuring device 10 is configured to take a measurement(s) of a component(s) of the exhaust gas in order to, for example, determine conditions in the electric arc furnace.

The gas component measuring device 10 includes a cyclone 20 and a laser gas analyzer 40, which is configured to take a measurement(s) of the component(s) of the exhaust gas in the cyclone 20. Specifically, the laser gas analyzer 40 takes a measurement(s) of the component(s) of the exhaust gas by applying, to the exhaust gas flowing in the cyclone 20, laser light depending on properties of the exhaust gas to analyze the exhaust gas.

One end side of the cyclone 20 in the axial direction of the central axis T thereof has a cylindrical shape and the other end side thereof has a substantially truncated cone shape. Specifically, the axial direction is along the vertical direction, the upper side of the cyclone 20 with respect to a middle portion has the cylindrical shape, and the lower side thereof has the truncated cone shape, in which the diameter decreases downward.

The gas inlet 22 is provided in a side surface 20a of the cyclone 20 in one end portion (upper end portion) in the axial direction (vertical direction) and is connected to the exhaust duct via an inlet pipe 60 connecting between the cyclone 20 and the exhaust duct. The gas inlet 22 and the inlet pipe 60 are provided so that the flow of the exhaust gas passing through the gas inlet 22 is directed along a tangential direction of the circumference of the cyclone 20 (in other words, the longitudinal direction of the inlet pipe 60 is along the tangential direction).

The gas outlet 24 is provided in a bottom portion 20b of the cyclone 20, that is, at the other end (lower end) in the axial direction of the cyclone 20 (vertical direction) and is connected to the exhaust duct via an outlet pipe, not shown, connecting between the cyclone 20 and the exhaust duct.

The outlet pipe is provided with a suction device, with which the exhaust gas in the exhaust duct is introduced into the cyclone 20 and the exhaust gas discharged from the gas outlet 24 of the cyclone 20 is returned into the exhaust duct. While the suction device is not particularly limited as long as the device can suck and discharge a gas that contains particulate matter, such as dust and liquid droplets, it is preferable to use a pump having no moving part, such as an ejector pump.

A typical cyclone (those described in Patent Document 1 and Patent Document 2, for example) is configured to separate the particulate matter, such as dust and liquid droplets, from gas, such as the exhaust gas, discharge the particulate matter (dust and liquid droplets) from the outlet that is positioned at the bottom portion (lower end), and discharge the gas (exhaust gas) from the outlet that is positioned at a ceiling portion (upper end). This is because such a typical cyclone is used for the purpose of removing the particulate matter (dust and liquid droplets) from the gas (exhaust gas) containing the particulate matter (dust and liquid droplets).

In contrast, the cyclone 20 according to this embodiment is not used as the typical, particulate matter-removing device. In other words, it is not used for removing the particulate matter (dust and liquid droplets) from the exhaust gas containing the particulate matter (dust and liquid droplets). For this reason, one outlet only is provided in the bottom portion 20b (lower end), and this outlet is a common outlet for the gas (exhaust gas) and the particulate matter (dust and liquid droplets). In other words, not only the exhaust gas but also dust and liquid droplets are discharged from the gas outlet 24. Note that the top of the cyclone 20 is closed by a ceiling portion 20c and no opening is provided therein.

The laser gas analyzer 40 takes, in the cyclone 20, a measurement(s) of the component(s) of the exhaust gas that contains the particulate matter and is introduced into the cyclone 20 through the gas inlet 22. As described above, the laser gas analyzer 40 takes a measurement(s) of the component(s) of the exhaust gas by applying, to the exhaust gas flowing in the cyclone 20, the laser light depending on the properties of the exhaust gas to analyze the exhaust gas.

The laser gas analyzer 40 includes a light emitting portion 42 and a light receiving portion 44.

The light emitting portion 42, which emits laser light toward the light receiving portion 44, is provided outside the cyclone 20 at a position adjacent to the cyclone 20 in the lateral direction. In the cyclone 20, a pair of opening portions 26 opposed to each other are formed in the side surface 20a. The light emitting portion 42 is disposed so as to emit the laser light into the cyclone 20 through one of the pair of opening portions 26 (referred to as the entrance opening portion 26a herein).

The light receiving portion 44, which receives the laser light emitted by the light emitting portion 42, is provided outside the cyclone 20 at a position adjacent to the cyclone 20 in the lateral direction on the side opposite to the light emitting portion 42 side. The light receiving portion 44 is disposed so as to receive the laser light that exits through the other of the pair of opening portions 26 (referred to as the exit opening portion 26b herein).

In this embodiment, the position of the light receiving portion 44 (exit opening portion 26b) in the vertical direction coincides with the position of the light emitting portion 42 (entrance opening portion 26a) in the vertical direction. Thus, the laser light travels in a direction (lateral direction) perpendicular to the axial direction. The exit opening portion 26b and the entrance opening portion 26a are formed in a lower portion of the cylindrical portion that is positioned in the one side of the cyclone 20.

The laser light emitted from the light emitting portion 42 enters into the cyclone 20 through the entrance opening portion 26a and travels in the cyclone 20. The laser light travelling in the cyclone 20 is attenuated by the contact with the exhaust gas in the cyclone 20. The attenuated laser light comes out of the cyclone 20 through the exit opening portion 26b and is received by the light receiving portion 44. With regard to the received laser light, which wave length of light is attenuated and how much the attenuation is are detected (analyzed) to take a measurement(s) of the component(s) of the exhaust gas.

Note that the exhaust gas contains the particulate matter (dust and liquid droplets) and, when the concentration of such particulate matter is high, there is a possibility that the laser light cannot appropriately reach the light receiving portion 44 and measurement is therefore not performed with high accuracy. In the cyclone 20, when the exhaust gas containing the particulate matter is introduced through the gas inlet 22, the exhaust gas flows downward in the cyclone 20 while whirling. During this process, the exhaust gas and the particulate matter are subjected to centrifugal separation, which results in the distribution of the particulate matter and the exhaust gas to an outer area (radially outer area in the cyclone 20, that is, area near the side surface 20a of the cyclone 20) and a central area (radially inner area in the cyclone 20), respectively.

Accordingly, the gas component measuring device 10 according to this embodiment is configured so that the laser gas analyzer 40 takes a measurement(s) of the component(s) of the exhaust gas at the central area other than the outer area in the cyclone 20 so that hindrance to travel of the laser light by the particulate matter is reduced as much as possible. For the purpose of realizing such measurement, the gas component measuring device 10 includes displacing devices 50 configured to reduce the particulate matter on the optical path of the laser light by hindering passage of the particulate matter in the vicinities of the pair of opening portions 26 within the cyclone 20. The displacing devices 50 according to this embodiment include hollow pipes 52 provided so as to protrude inward from the pair of opening portions 26.

Accordingly, the exhaust gas containing the particulate matter is physically blocked by the hollow pipes 52, so that it is possible to prevent the exhaust gas containing the particulate matter and the laser light from crossing each other in the hollow pipes 52. Thus, it is possible to limit the area, in which the exhaust gas containing the particulate matter and the laser light cross each other, to the central area, in which the proportion of the particulate matter is relatively low. Even when a small amount of the gas stagnating (drifting) near the tips of the hollow pipes 52 enters into the hollow pipes 52 through the tips thereof, the entrance of the particulate matter is appropriately avoided, so that the proportion of the particulate matter in the hollow pipes 52 is very low. Accordingly, by providing such hollow pipes 52, it is possible to solve the problem that the laser light is hindered from reaching the light receiving portion 44 by the particulate matter.

Note that the inner diameter of the hollow pipes 52 is set substantially equal to or greater than a width (half value width) of the laser light so that the laser light is not blocked. It is preferable that the amount of protrusion of the hollow pipe 52 from the opening portion 26 be equal to or greater than one tenth of the diameter of the cyclone 20 at the opening portions 26. Since it is preferable that the distance between the tips of the hollow pipes 52 (length of the section, in which the laser light is applied to the exhaust gas) be equal to or greater than two times of the inner diameter of the hollow pipes, it is preferable that the upper limit of the amount of protrusion be set so that such a distance is attained.

The cyclone 20 includes a protruding portion 28 that extends downward from the ceiling portion 20c and the outer shape of which is a surface of revolution, the axis of which is the (vertical) central axis of the cyclone 20. The protruding portion 28 according to this embodiment has an inverted cone-like shape, in which the diameter decreases downward. The protruding portion 28 functions as a back-flow-preventing protrusion. Specifically, when the protruding portion 28 is not present, there is a possibility that, in the upper portion of the cyclone 20, the exhaust gas stagnates because the whirl (rotational flow) of the exhaust gas is less prone to occur. When the exhaust gas stagnates, there is a fear that the backflow of the exhaust gas in the cyclone 20 from the gas inlet 22 to the inlet pipe 60 occurs. In contrast, in this embodiment, since the protruding portion 28 is provided, it is possible to appropriately induce the whirl (rotational flow) of the exhaust gas and it is therefore possible to suppress the occurrence of backflow of the exhaust gas.

===Effectiveness of the Gas Component Measuring Device 10 According to this Embodiment===

As described above, the gas component measuring device 10 according to this embodiment includes: the cyclone 20 that has the gas inlet 22; and the laser gas analyzer 40 that takes, in the cyclone 20, a measurement(s) of the component(s) of the exhaust gas that contains the particulate matter and is introduced into the cyclone 20 through the gas inlet 22. Accordingly, it is possible to realize the gas component measuring device 10 capable of quickly taking a measurement(s) of the component(s) of the exhaust gas.

The exhaust gas contains the particulate matter, such as dusts and liquid droplets, and, when the concentration of such particulate matter is high, there is a possibility that the laser light cannot appropriately reach the light receiving portion and measurement is therefore not performed with high accuracy. For this reason, in conventional cases, a method is adopted, in which the particulate matter is removed from the exhaust gas with the use of a cyclone beforehand and the exhaust gas after removal of the particulate matter is then subjected to measurement using the gas component measuring device.

However, in the conventional cases, it is necessary to perform the step of removing the particulate matter from the exhaust gas separately before taking a measurement(s) of the exhaust gas and therefore, there has been a problem of taking a long time.

In contrast, in the gas component measuring device 10 according to this embodiment, a measurement(s) of the component(s) of the exhaust gas is/are taken in the cyclone 20, so that it is possible to perform the measurement aiming at, or selecting, the area, or region, in which the proportion of the particulate matter is relatively low in the cyclone 20 that causes the centrifugal separation of the particulate matter from the exhaust gas. Thus, it is possible to solve the problem that the laser light is hindered from reaching the light receiving portion 44 by the particulate matter. In this case, the step of removing the particulate matter from the exhaust gas is not performed, so that it is possible to quickly take a measurement(s) of the component(s) of the exhaust gas.

Specifically, in this embodiment, the cyclone 20 is not used as a particulate matter-removing device for removing the particulate matter from the exhaust gas (the particulate matter-removing function of the cyclone 20 is not used), only the centrifugal separation function of the cyclone 20 is used. Owing to such an idea (contrivance), it is made possible to solve the problem that the laser light is hindered from reaching the light receiving portion 44 by the particulate matter and it is also made possible to take a measurement(s) of the component(s) of the exhaust gas more quickly as compared to the conventional cases.

Furthermore, in conventional cases, the step of removing the particulate matter from the exhaust gas and the step of taking, by a laser gas analyzer, a measurement(s) of the exhaust gas after removal of the particulate matter have been separately performed and pieces of equipment corresponding to the respective steps have been required. However, in this embodiment, the step of removing the particulate matter from the exhaust gas is not performed, so that it is possible to simplify the equipment for the gas component measuring device 10.

Moreover, in this embodiment, the laser gas analyzer 40 takes a measurement(s) of the component(s) of the exhaust gas at the central area other than the outer area in the cyclone 20.

Consequently, as described above, it is made possible to appropriately solve the problem that the laser light is hindered from reaching the light receiving portion 44 by the particulate matter.

Moreover, in this embodiment, the pair of opening portions 26 opposed to each other are provided in the side surface 20a of the cyclone 20, the light emitting portion 42 of the laser gas analyzer 40 is disposed so as to emit the laser light into the cyclone 20 through one of the pair of opening portions 26, and the light receiving portion 44 of the laser gas analyzer 40 is disposed so as to receive the laser light that exits through the other of the pair of opening portions 26.

Accordingly, it is possible to realize a setup for taking a measurement(s) of the component(s) of the exhaust gas in the cyclone 20 in a simple way.

Moreover, in this embodiment, the gas component measuring device 10 includes the displacing devices 50 configured to reduce the particulate matter on the optical path of the laser light by hindering passage of the particulate matter in the vicinities of the pair of opening portions 26 within the cyclone 20. The displacing devices 50 include the hollow pipes 52 provided so as to protrude inward from the pair of opening portions 26.

Accordingly, it is possible to appropriately realize a setup for performing the measurement aiming at, or selecting, the area, or region, in which the proportion of the particulate matter is relatively low in the cyclone 20 that causes the centrifugal separation of the particulate matter from the exhaust gas.

Moreover, in contrast to typical cyclones, the top of the cyclone 20 according to this embodiment is closed by the ceiling portion 20c, the gas inlet 22 is provided in the side surface 20a, and the gas outlet 24 for discharging the exhaust gas along with the particulate matter is provided at the lower end.

Thus, there is no need to provide both the bottom outlet for particulate matter and the ceiling portion outlet for exhaust gas as in the case of the typical cyclone, so that it is possible to simplify the structure of the cyclone 20.

Furthermore, the cyclone 20 is not configured to discharge the particulate matter and the exhaust gas separately, so that the exhaust gas containing the particulate matter passes through the cyclone 20 (in other words, the particulate matter and the exhaust gas are in a mixed state both at the time of entrance and at the time of exit). Accordingly, the elements to be maintained and the movable portions that have been required in a facility for disposing of the removed particulate matter become unnecessary.

Moreover, in this embodiment, the cyclone 20 includes the protruding portion 28 that extends downward from the ceiling portion 20c and the outer shape of which is a surface of revolution, the axis of which is the (vertical) central axis of the cyclone 20. The protruding portion 28 has an inverted cone-like shape, in which the diameter decreases downward.

Accordingly, as described above, it is possible to appropriately induce the whirl (rotational flow) of the exhaust gas, so that it is possible to suppress the occurrence of backflow of the exhaust gas.

===Other Embodiments===

While the gas component measuring device according to the present invention has been described with reference to the embodiment, this embodiment is for facilitating understanding the present invention, that is, the present invention is not limited to the above-described embodiment. Needless to say, the present invention can be modified or improved therefrom without departing from the spirits and the equivalent thereof is included in the scope of the present invention.

For example, in the above embodiment, both the gas inlet 22 and the gas outlet 24 are connected to the exhaust duct, through which the exhaust gas discharged from the steel making electric arc furnace flows, and the gas component measuring device 10 is configured to take a measurement(s) of the component(s) of this exhaust gas. In other words, the subject gas is the exhaust gas discharged from the steel making electric arc furnace. However, the subject gas is not limited to this and may be another combustion gas or process gas.

Note that the concentration of particulate matter in the exhaust gas discharged from a steel making electric arc furnace is very high as compared to other combustion gases or process gasses and therefore, the problem that the laser light is hindered from reaching the light receiving portion 44 by the particulate matter is apt to occur. Accordingly, the effect of the present invention becomes more advantageous when a measurement(s) of the component(s) of the exhaust gas discharged from a steel making electric arc furnace is/are taken.

Figure 3:
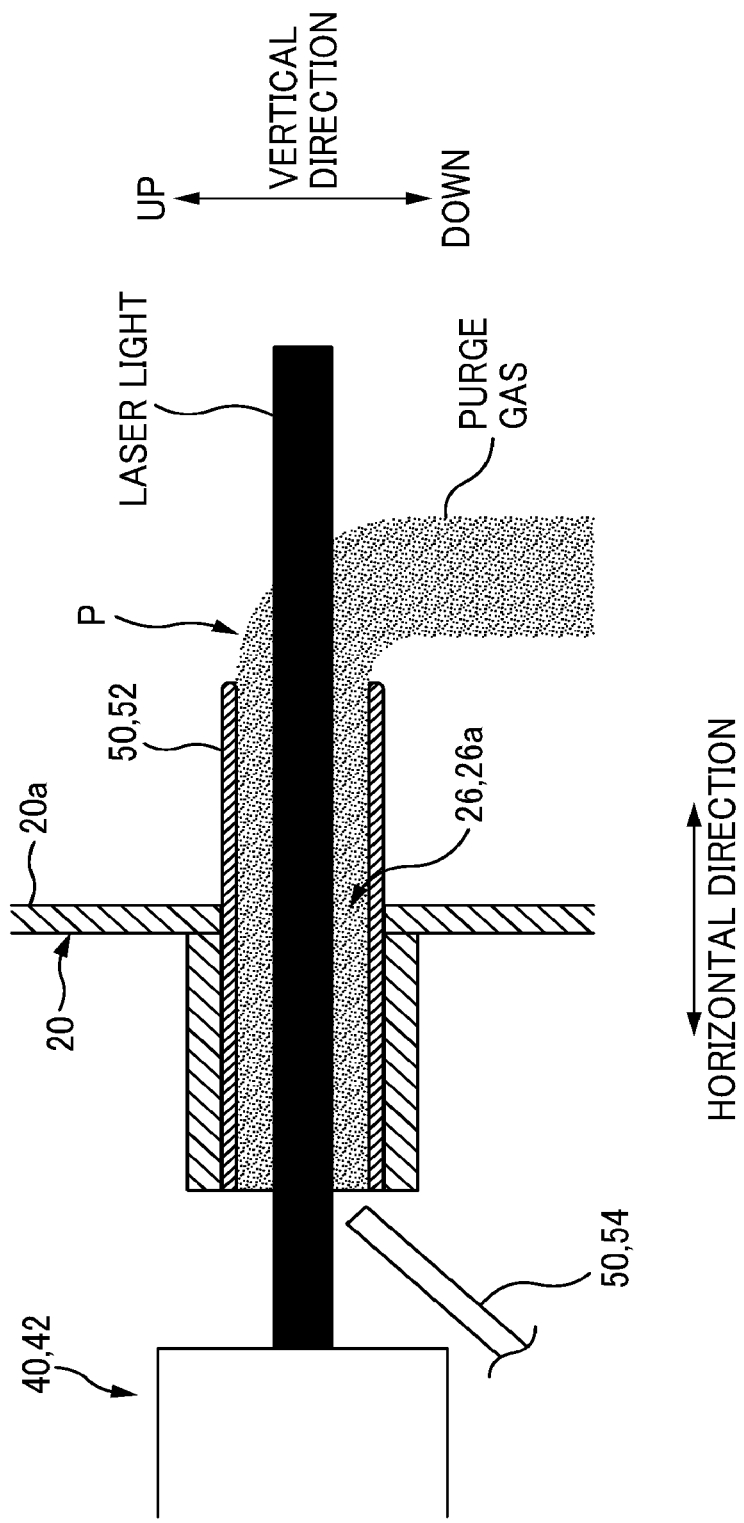
FIG. 3 is an explanatory diagram for explaining a gas component measuring device according to a second embodiment.

As shown in FIG. 3, the displacing devices 50 may include gas injection devices 54 configured to inject a purge gas (nitrogen gas, for example) inward through the pair of opening portions 26 in addition to the hollow pipes 52. FIG. 3 is an explanatory diagram for explaining a gas component measuring device 10 according to a second embodiment. In the gas component measuring device 10 according to the second embodiment, the purge gas injected by the gas injection devices 54 enter into the cyclone 20 through the pair of opening portions 26 (one opening portion 26 only is shown in FIG. 3 for the sake of simplicity) and the hollow pipes 52.

For this reason, the exhaust gas containing the particulate matter is not crossed by the laser light not only in the hollow pipes 52 but also in the vicinities of the outlet openings of the hollow pipes 52 (region indicated by the reference symbol P in FIG. 3) by the action of the purge gas flowing into the cyclone 20. Accordingly, it is possible to appropriately limit the area, in which the exhaust gas containing the particulate matter and the laser light cross each other, to the central area, in which the proportion of the particulate matter is relatively low. Thus, by providing such gas injection devices 54, it is possible to more appropriately solve the problem that the laser light is hindered from reaching the light receiving portion 44 by the particulate matter.

While the gas injection devices 54 are provided in addition to the hollow pipes 52 in the second embodiment (FIG. 3), a configuration may be adopted, in which the gas injection devices 54 are provided without providing the hollow pipes 52. In such a configuration, it is possible to prevent the exhaust gas containing the particulate matter and the laser light from crossing each other in the vicinities of the outlet openings of the opening portions 26. Accordingly, the problem that the laser light is hindered from reaching the light receiving portion 44 by the particulate matter is solved also in the case of this configuration. Note that in such a configuration (no hollow pipe 52 is provided), it is more preferable to increase the flow rate of the purge gas as compared to the case where the gas injection devices 54 are additionally provided to the setup having the hollow pipes 52.

DESCRIPTION OF REFERENCE NUMERALS

10 gas component measuring device
20 cyclone
20a side surface
20b bottom portion
20c ceiling portion
22 gas inlet
24 gas outlet
26 opening portion
26a entrance opening portion
26b exit opening portion
28 protruding portion
40 laser gas analyzer
42 light emitting portion
44 light receiving portion
50 displacing device
52 hollow pipe
54 gas injection device
60 inlet pipe
T central axis

The invention claimed is:

1. A gas component measuring device comprising:
    a cyclone including a gas inlet; and
    a laser gas analyzer configured to take, in the cyclone, a measurement of a component of a subject gas that contains particulate matter and is introduced into the cyclone through the gas inlet, wherein:
    the cyclone includes a pair of opening portions, opposed to each other, in a side surface thereof;
    a light emitting portion of the laser gas analyzer is disposed to emit laser light into the cyclone through one of the pair of opening portions, and a light receiving portion of the laser gas analyzer is disposed to receive the laser light that exits through the other of the pair of opening portions; and
    the gas component measuring device further includes a displacing device configured to reduce the particulate matter on an optical path of the laser light by hindering passage of the particulate matter in a vicinity of each of the pair of opening portions within the cyclone.

2. The gas component measuring device according to claim 1, wherein
    the laser gas analyzer is configured to take the measurement of the component of the subject gas at a central area other than an outer area in the cyclone.

3. The gas component measuring device according to claim 1, wherein
    the displacing device includes a gas injection device configured to inject purge gas inward through each of the pair of opening portions.

4. The gas component measuring device according to claim 1, wherein
    the displacing device includes a hollow pipe provided to protrude inward from each of the pair of opening portions.

5. The gas component measuring device according to claim 1, wherein
    a top of the cyclone is closed by a ceiling portion, the gas inlet is provided in the side surface of the cyclone, and a gas outlet, from which the subject gas is discharged along with the particulate matter, is provided at a lower end of the cyclone.

6. The gas component measuring device according to claim 5, wherein
the cyclone includes a protruding portion that extends downward from the ceiling portion and an outer shape of which is a surface of revolution, an axis of which is a vertical, central axis of the cyclone.

7. The gas component measuring device according to claim 6, wherein
the protruding portion has an inverted cone-like shape, in which a diameter thereof decreases downward.

8. The gas component measuring device according to claim 5, wherein
both the gas inlet and the gas outlet, from which the subject gas is discharged along with the particulate matter, are connected to an exhaust duct, through which exhaust gas discharged from a steel making electric arc furnace flows, and
the gas component measuring device is configured to take the measurement of the component of the exhaust gas.

9. The gas component measuring device according to claim 6, wherein
both the gas inlet and the gas outlet, from which the subject gas is discharged along with the particulate matter, are connected to an exhaust duct, through which exhaust gas discharged from a steel making electric arc furnace flows, and
the gas component measuring device is configured to take the measurement of the component of the exhaust gas.

10. The gas component measuring device according to claim 3, wherein
a top of the cyclone is closed by a ceiling portion, the gas inlet is provided in the side surface of the cyclone, and a gas outlet, from which the subject gas is discharged along with the particulate matter, is provided at a lower end of the cyclone.

11. The gas component measuring device according to claim 10, wherein
the cyclone includes a protruding portion that extends downward from the ceiling portion and an outer shape of which is a surface of revolution, an axis of which is a vertical, central axis of the cyclone.

12. The gas component measuring device according to claim 10, wherein
both the gas inlet and the gas outlet, from which the subject gas is discharged along with the particulate matter, are connected to an exhaust duct, through which exhaust gas discharged from a steel making electric arc furnace flows, and
the gas component measuring device is configured to take the measurement of the component of the exhaust gas.

13. The gas component measuring device according to claim 11, wherein
both the gas inlet and the gas outlet, from which the subject gas is discharged along with the particulate matter, are connected to an exhaust duct, through which exhaust gas discharged from a steel making electric arc furnace flows, and
the gas component measuring device is configured to take the measurement of the component of the exhaust gas.

14. The gas component measuring device according to claim 4, wherein
a top of the cyclone is closed by a ceiling portion, the gas inlet is provided in the side surface of the cyclone, and a gas outlet, from which the subject gas is discharged along with the particulate matter, is provided at a lower end of the cyclone.

15. The gas component measuring device according to claim 14, wherein
the cyclone includes a protruding portion that extends downward from the ceiling portion and an outer shape of which is a surface of revolution, an axis of which is a vertical, central axis of the cyclone.

16. The gas component measuring device according to claim 14, wherein
both the gas inlet and the gas outlet, from which the subject gas is discharged along with the particulate matter, are connected to an exhaust duct, through which exhaust gas discharged from a steel making electric arc furnace flows, and
the gas component measuring device is configured to take the measurement of the component of the exhaust gas.

17. The gas component measuring device according to claim 15, wherein
both the gas inlet and the gas outlet, from which the subject gas is discharged along with the particulate matter, are connected to an exhaust duct, through which exhaust gas discharged from a steel making electric arc furnace flows, and
the gas component measuring device is configured to take the measurement of the component of the exhaust gas.

\* \* \* \* \*